United States Patent
Thompson

(10) Patent No.: US 7,856,331 B2
(45) Date of Patent: Dec. 21, 2010

(54) SCANNER CALIBRATION

(76) Inventor: Robert D. Thompson, 1920 Hyde Dr., Loveland, CO (US) 80538

( * ) Notice: Subject to any disclaimer, the term of this patent is extended or adjusted under 35 U.S.C. 154(b) by 1645 days.

(21) Appl. No.: 11/111,617

(22) Filed: Apr. 20, 2005

(65) Prior Publication Data
US 2005/0185227 A1 Aug. 25, 2005

Related U.S. Application Data

(63) Continuation of application No. 09/629,041, filed on Jul. 31, 2000, now Pat. No. 6,900,448.

(51) Int. Cl.
G06F 19/00 (2006.01)
G06F 17/40 (2006.01)
G01D 18/00 (2006.01)

(52) U.S. Cl. ........................ 702/85; 73/865.9; 356/256; 382/100; 382/325; 702/90; 702/104; 702/182

(58) Field of Classification Search ................. 73/1.01, 73/1.88, 432.1, 865.9; 355/133; 356/124, 356/256; 382/100, 325; 702/1, 85, 86, 87, 702/90, 104, 105, 107, 124, 182, 183, 188, 702/189
See application file for complete search history.

(56) References Cited

U.S. PATENT DOCUMENTS

| | | | | |
|---|---|---|---|---|
| 3,952,144 A * | 4/1976 | Kolker | ................. | 358/406 |
| 4,216,503 A * | 8/1980 | Wiggins | ................. | 358/446 |
| 4,404,597 A * | 9/1983 | Stoffel | ................. | 358/443 |
| 4,555,732 A * | 11/1985 | Tuhro | ................. | 348/241 |
| 4,736,245 A * | 4/1988 | Seto et al. | ................. | 358/504 |
| 4,926,041 A * | 5/1990 | Boyd | ................. | 250/226 |
| 4,980,759 A * | 12/1990 | Smyth | ................. | 358/500 |
| 5,122,871 A * | 6/1992 | Israeli et al. | ................. | 358/515 |
| 5,170,267 A * | 12/1992 | Blitz et al. | ................. | 358/475 |
| 5,239,387 A * | 8/1993 | Stein et al. | ................. | 358/444 |
| 5,495,329 A * | 2/1996 | Anderson et al. | ................. | 356/218 |
| 5,519,441 A * | 5/1996 | Gusmano et al. | ................. | 348/207.99 |
| 5,563,723 A * | 10/1996 | Beaulieu et al. | ................. | 358/461 |
| 5,764,386 A * | 6/1998 | Robinson | ................. | 358/504 |
| 5,781,206 A * | 7/1998 | Edge | ................. | 347/19 |
| 5,821,993 A * | 10/1998 | Robinson | ................. | 348/187 |
| 5,864,410 A * | 1/1999 | McVicar | ................. | 358/498 |
| 5,877,787 A * | 3/1999 | Edge | ................. | 347/19 |
| 6,027,201 A * | 2/2000 | Edge | ................. | 347/19 |
| 6,038,038 A * | 3/2000 | Selby et al. | ................. | 358/446 |
| 6,297,873 B1 * | 10/2001 | Furuya | ................. | 355/40 |
| 6,327,047 B1 * | 12/2001 | Motamed | ................. | 358/1.15 |
| 6,512,845 B1 * | 1/2003 | Haikin et al. | ................. | 382/165 |
| 6,529,292 B1 * | 3/2003 | Tsai | ................. | 358/406 |

(Continued)

FOREIGN PATENT DOCUMENTS

DE 19924143 A1 * 12/1999

(Continued)

Primary Examiner—Edward R Cosimano

(57) ABSTRACT

The present invention provides a method and system for optimizing the time required for scanning a document with any conventional scanner. More specifically, the present invention will utilize calibration information from the initial power-up calibration or any other calibration, and the information from any previous scans to expedite or eliminate the need for future calibration requests. This process will save time for the user to obtain an optimal scan and increase the operable life span of the scanner by eliminating many repetitive scan cycles.

8 Claims, 3 Drawing Sheets

U.S. PATENT DOCUMENTS

| | | | |
|---|---|---|---|
| 6,583,424 B2 * | 6/2003 | Staton et al. | 250/461.2 |
| RE38,180 E * | 7/2003 | Edge | 347/19 |
| 6,730,909 B2 * | 5/2004 | Butler | 250/338.1 |
| 6,740,871 B1 * | 5/2004 | Staton et al. | 250/252.1 |
| 6,853,392 B2 * | 2/2005 | Maeda | 347/116 |
| 6,854,884 B2 * | 2/2005 | Kerrien et al. | 378/207 |
| 6,867,885 B2 * | 3/2005 | Inage | 358/443 |
| 6,900,448 B1 * | 5/2005 | Thompson | 250/559.1 |
| 6,909,454 B2 * | 6/2005 | Hunt | 348/96 |
| 6,956,203 B2 * | 10/2005 | Staton et al. | 250/252.1 |
| 7,233,418 B2 * | 6/2007 | Cheung | 358/406 |
| 7,415,231 B2 * | 8/2008 | Maeda | 399/301 |
| 2002/0033883 A1 * | 3/2002 | Hunt | 348/108 |
| 2002/0074499 A1 * | 6/2002 | Butler | 250/338.1 |
| 2002/0163996 A1 * | 11/2002 | Kerrien et al. | 378/207 |
| 2002/0195554 A1 * | 12/2002 | Staton et al. | 250/252.1 |
| 2004/0084612 A1 * | 5/2004 | Staton et al. | 250/252.1 |
| 2004/0095454 A1 * | 5/2004 | Maeda | 347/116 |
| 2004/0217271 A1 * | 11/2004 | Staton et al. | 250/252.1 |
| 2004/0239747 A1 * | 12/2004 | Maeda | 347/116 |
| 2005/0185227 A1 * | 8/2005 | Thompson | 358/474 |
| 2006/0045577 A1 * | 3/2006 | Maeda | 399/301 |
| 2006/0164505 A1 * | 7/2006 | Maeda | 347/234 |
| 2007/0292146 A1 * | 12/2007 | Takesue et al. | 399/9 |

FOREIGN PATENT DOCUMENTS

| | | |
|---|---|---|
| EP | 0 687 103 A2 * | 12/1995 |
| EP | 0 844 784 A2 * | 5/1998 |
| EP | 0 862 320 A2 * | 9/1998 |

* cited by examiner

SCANNER CALIBRATION

This patent application is a continuation of application Ser. No. 09/629,041 filed 2000 Jul. 31, now Pat. No. 6,900,448 entitled "METHOD AND SYSTEM FOR DYNAMIC SCANNER CALIBRATION", by Robert D. Thompson, which is hereby incorporated by reference in its entirety.

BACKGROUND OF THE INVENTION

1. Field of the Invention

This invention relates in general to calibrating scanners, and more particularly to a process and system for effectively and efficiently calibrating a scanner.

2. Description of the Related Art

A problem prevalent in conventional scanners involves the process of maintaining or calibrating the scanner to regularly obtain optimal efficiency. The calibration process is used to correct for offset errors and gain errors in the sensor's signal. Offset and gain errors can be caused by the characteristics of individual components responsible for converting the light reflected from the image into electronic image data. These errors may result from nonuniformities in the characteristics of the illumination and sensing components in the scanner, as well as from time varying drifts of such characteristics. For example, a charged coupled device (CCD) sensor may have inherent offset and gain characteristics unique to itself or a scanner may contribute to offset and gain errors due to the present operating conditions. The operating conditions could include the operational temperatures, lamp color and intensity, system noise, exposure balance, current draw, etc.

If offset errors or gain errors are not adequately addressed (i.e. the signal being processed is not adjusted to counteract the offset or gain errors) the processing of the signal will not be accurate which, in an image processing system, can cause the generated picture or image to have a lower quality.

To address these problems, typical image processing systems or image scanning systems perform calibrations of the imaging system at intervals. Often, the calibration is performed at power-up but, in some cases, calibration is performed at fixed intervals, sometimes as frequently as each scan. Each calibration will typically take longer than the time required to scan a document. Consequently, a user typically wastes a lot of time waiting for a scanner to calibrate before a document can be scanned.

The time required to calibrate a scanner is related to the time it takes for a scanner to obtain the reference reflectance values of a calibration strip. For example, during the calibration of digital scanners, an imaging capture system is positioned to allow a sensor array to view a strip of calibration information and/or patterns located on or near the platen. It is important that an accurate value of the reflectance of this calibration strip be known to the digital scanner to achieve an absolute reflectance calibration and generate accurate correction values for subsequent document reading operations.

In summary, conventional application software for a scanner will typically calibrate a scanner only after a specific condition. A condition could include a scanner being powered-on, the user requesting a calibration, a predetermined number of scans being completed, and a prescan setting. With any of these conditions, no portion of an earlier calibration or scan can be used to expedite the scanning process. Consequently, the user must wait for a calibration of a scanner before their scan will be performed.

SUMMARY OF THE INVENTION

In one aspect of the present invention, a method is provide to calibrate a scanner being coupled to a host computer. The method includes the steps of retrieving operational data from a memory element of the host computer; evaluating the retrieved data for degradation in the operation of the scanner; and calibrating the scanner to overcome the degradations.

The present invention provides a method and system for optimizing the time required for scanning a document with any conventional scanner. More specifically, the present invention will utilize calibration information from the initial power-up calibration or any other calibration, and the information from any previous scans to expedite or eliminate the need for future calibration requests. This process will save time for the user to obtain an optimal scan and increase the operable life span of the scanner by eliminating many repetitive scan cycles.

BRIEF DESCRIPTION OF THE DRAWINGS

Other aspects and advantages of the invention will become apparent upon reading the following detailed description and upon reference to the drawings, in which.

Figure 1:
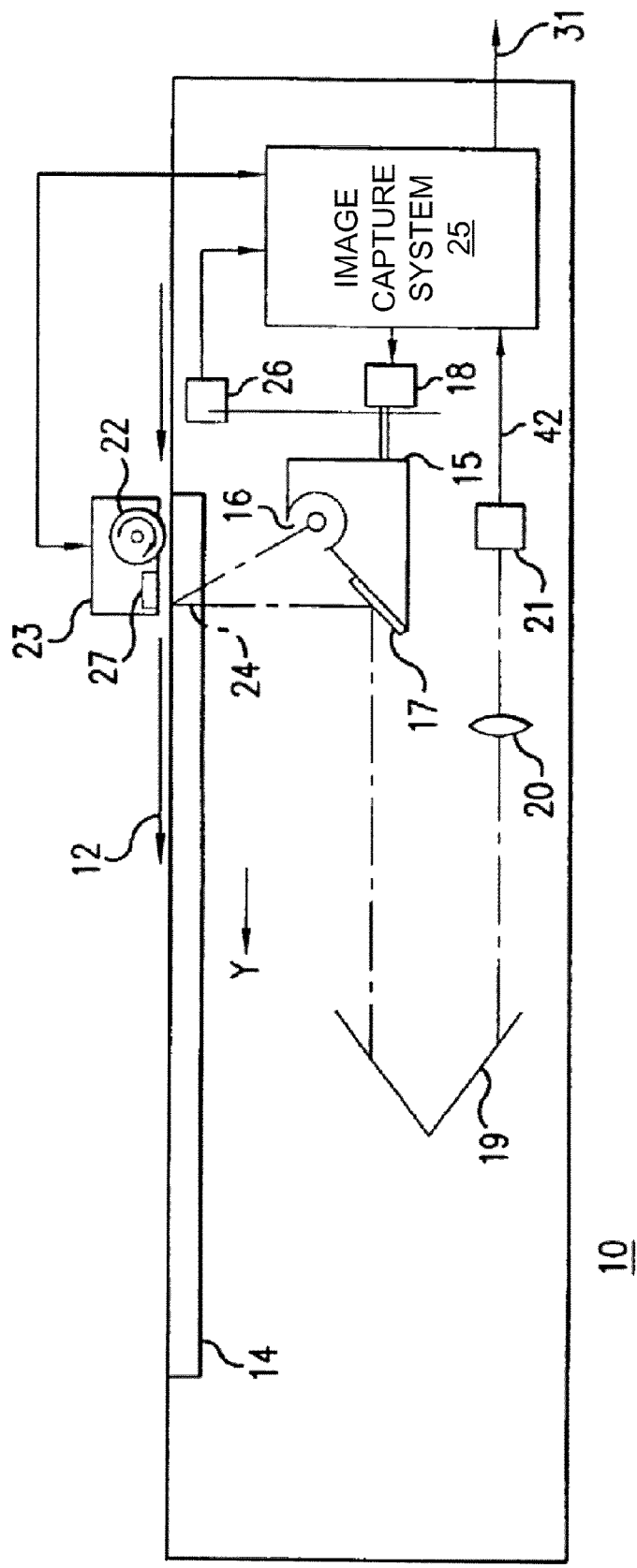
FIG. 1 illustrates a conventional flatbed scanner that would be operable with the present inventive process.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Broadly stated, the present invention provides a process for optimizing the time required for scanning a document with any conventional scanner. More specifically, the present invention will utilize calibration information from the initial power-up calibration or any other calibration, and the information from any previous scans to expedite or eliminate the need for future calibration requests. This process will save time for the user to obtain an optimal scan and increase the operable life span of the scanner by eliminating many repetitive calibration cycles.

The inventive calibration process may be implemented with any optical scanner acting alone or with another peripheral device, such as a printer or fax system that may or may not provide an automatic document feed (ADF) or a moving light source. Consequently, before the present inventive calibration process for any scanner is described, a brief component recitation of a flatbed scanner and how it works will now follow with reference to FIG. 1.

Turning now to the drawings, FIG. 1 shows a document scanner 10 with document 12 moving across transparent platen 14. Without limitation thereto, document 12 typically comprises a material having a black image on a white background. The document 12 is scanned, so as to convert the black visual image contained thereon into an electronic signal image that is useable by data processing machines, hard copy production, and the like.

For the stationary document scanner with a moving light source system, the scanning process, the details of which are not critical to the present invention, is accomplished by a moveable carriage 15 that contains a light source (scan bar) 16 and a cooperating reflecting mirror 17. Motor 18 is mechanically coupled to carriage 15, as by gears, cables or the like, to move carriage 15 in the Y scan direction, along the length of platen 14. The light reflected from the document is redirected by moveable corner mirror 19 into lens 20 and hence into sensor array 21. A maximum amount of light is typically reflected from the document's white background areas, whereas a minimum amount of light is reflected from the document's dense black image areas. In an alternate embodiment of the invention (not shown), light source 16, a system of reflecting mirrors 17 and 19, lens 20 and sensor array 21 are all mounted at fixed positions on movable carriage 15.

Sensor array 21, without limitation thereto, is preferably a charge coupled device (CCD) that is configured as a linear array of discrete light sensitive cells or light detector cells, each of which defines a document picture element (PEL). CCD's which can distinguish 300 or more PELS or cells per inch on the document provide good quality resolution and are readily available from contemporary commercial sources.

Light source (scan bar) 16 is constructed and arranged, in a manner well known to those skilled in the art, to produce a line of light, linear zone of light, or light footprint 24 on platen 14. Light footprint 24 extends in the X direction relative to document 12, perpendicular to the above defined Y scan direction. Each incremental position of light footprint 24 defines a row of document PELS. As footprint 24 moves (i.e. as the document is scanned and light footprint 24 moves in the Y direction) the document image is broken down into a number of parallel rows that extend in the X direction, each row being a large number of document PELS in length.

An electrical signal of sensor array 21, which represents the document image, is periodically read out, document row by document row, as carriage 15 moves in the Y direction relative to document 12 on platen 14. Imaging capture system 25 receives position information from tachometer position detector 26 and provides drive control signals to motor 18 (which can also be accomplished with a stepping motor) and also outputs 31 electrical image signal. As will be described in detail below in accordance with a preferred embodiment of the invention, system 25 also receives other operational parameters, and regulates any calibration process for the scanner 10 to correct the same.

If scanner 10 is used in the automatic document feed mode, than document 12 is grabbed by roller 22 and moved across platen 14 as it is being scanned by stationary scan bar 16 rather than carriage 15 moving scan bar 16 across platen 14 as described above for the stationary document scanner with a moving light source.

The rest of the scan process is similar to that for the stationary document scanner with a moving light source as described above. For the above example, the present invention includes a calibration strip 27 having a reference pattern that is all one color color or black (or any color other than white) and white and is attached to the automatic feed carriage 23.

Figure 2:
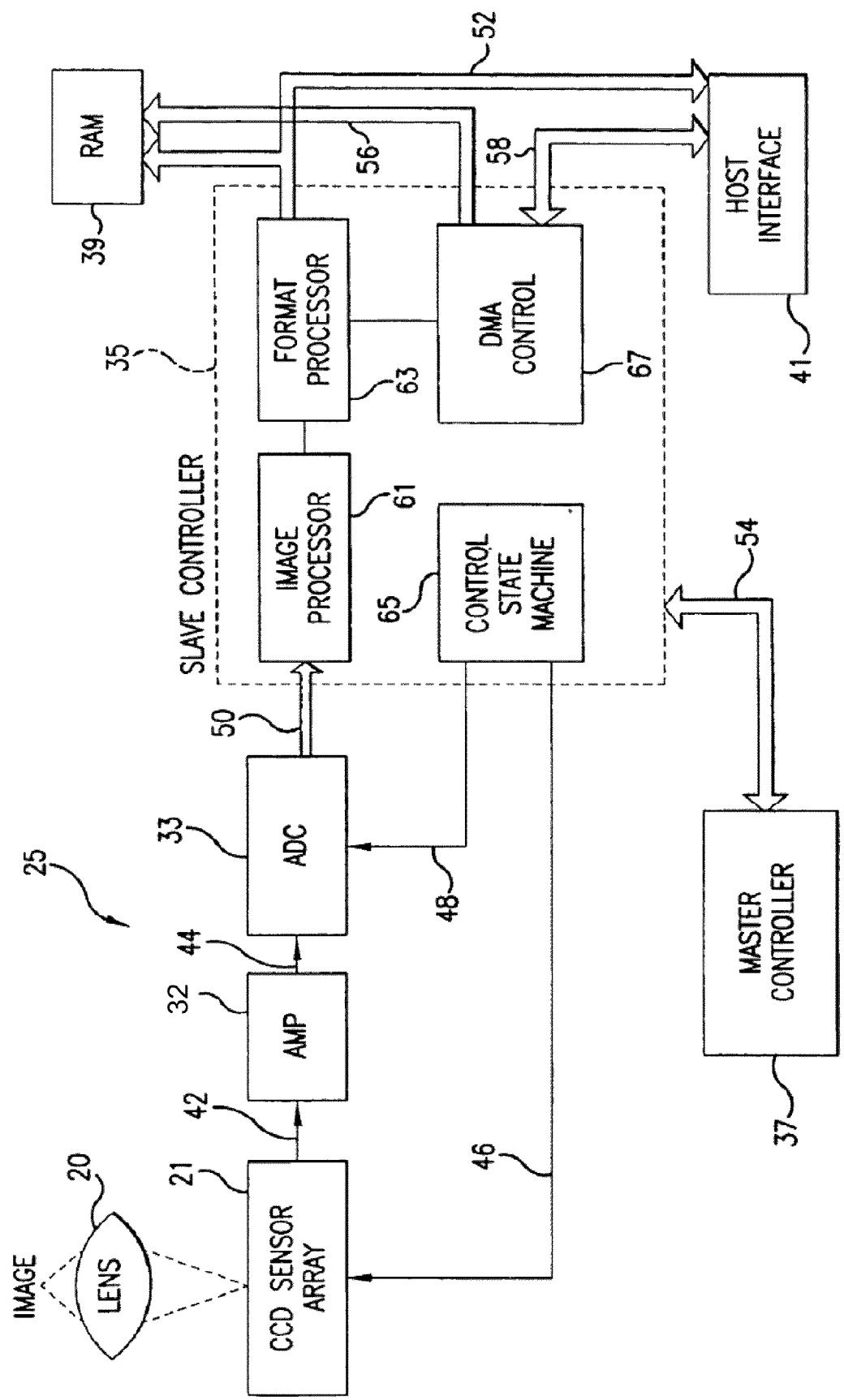
FIG. 2 illustrates a high level block diagram of a conventional image capture system that could be used with the scanner of FIG. 1.

FIG. 2 illustrates a high level block diagram of the imaging capture system 25 of the scanner 10 of FIG. 1. System 25 may be used with any optical scanner such as those generally described above and recited in commonly owned U.S. Pat. No. 4,926,041 to Boyd, the full text of which is incorporated herein by reference as if reproduced in full below.

Imaging capture system 25 includes a CCD (charge coupled device) sensor 21, an analog amplifier 32, an analog to digital converter (ADC) 33, a slave controller 35, a master controller 37, random access memory (RAM) 39 and a host interface 41. CCD sensor 21 provides a linear array of photoelectric sensing elements (not shown). Each element is configured to capture a pixel of an image and to produce an electrical charge corresponding to the intensity of light received.

Analog amplifier 32 is configured to receive a serial stream of charges from CCD sensor 21 over a line 42 and to sequentially convert each charge to an analog voltage. ADC 33 is configured to receive an analog voltage from amplifier 32 over a line 44 and to digitize the analog voltage. For example, ADC 33 may output a single or multi-bit digital word representing the varying gray scale of the pixel represented by the received voltage.

Slave controller 35 controls the timing of CCD sensor 21 and ADC 33 over control lines 46 and 48. Slave controller 35 receives the digitized data from ADC 33 over bus 50, provides any required formatting and/or image processing and stores the digitized data in RAM 39 via bus 52. In addition, slave controller 35 manages the transfer of data from RAM 39 to a host (not shown) such as an image processing system or general purpose computer system via host interface 41. Master controller 37 is provided to initiate an image scanning or calibration operation and to set up and supervise slave controller 35 via bus 54.

Slave controller 35 includes an image processor 61, a format processor 63, a control state machine 65 and a direct memory access (DMA) controller 67. Control state machine 65 provides clocking and other control signals to synchronize operation of CCD sensor 21 via control lines 46 and ADC 33 via control lines 48. Control state machine 65 also controls the scanning of CCD sensor 21 across an image.

DMA controller 67 controls the storage and removal of data from RAM 39. DMA controller 67 communicates with RAM 39 via bus 56 and with host interface 41 via bus 58. Image processor 61 provides image processing capabilities to image capture system 25. For example, image processor 10 may alter the resolution of the digitized image from ADC 33. Format processor 63 allows the data format of the digitized image to be changed prior to being stored in RAM 39 via bus 52. For example, format processor 63 may present the data representing the digitized image to RAM 39 in single or multi-bit per pixel format. Format processor 63 also communicates with a host via bus 52.

Exchange of data between RAM 39 and the host computer via bus 52 is discussed in detail in commonly owned U.S. Pat. No. 5,239,387 to Stein et al., the full text of which is incorporated herein by reference as if reproduced in full below.

In the preferred embodiment, slave controller 35 is implemented as an ASIC (Application Specific Integrated Circuit). Master controller 37 is a general purpose microprocessor such as a Motorola 68HC11, available from Motorola, Inc., Schaumburg, Ill. CCD sensor 21 is a Toshiba TCD137C, available frown Toshiba America Electronic Components, Inc., Irvine, Calif.

The computer or host system interacts with the above scanner 10 by a conventional means, such as a cable or a data path over a network or the Internet. The host computer communicates with the scanner to initial operational commands and receive operational information from conventional sensors in the system and scanner. From the information, the host computer, using a conventional method, will be able to recognize operational conditions selected from the group including:
1. Lamp intensity;
2. Lamp uniformity;
3. Lamp color drift;
4. Lamp temperature;
5. Lamp current draw;
6. Ambient temperature;
7. Scanner to PC interface change (e.g., turn-on of PC, plug-in of scanner to PC, component alteration, etc.);
8. Accessory connection (I.e. ADF or transparency adapter);
9. Home position failure (determining the origin coordinate of scan bed);
10. System or electrical noise (e.g., CCD temperature change);
11. Scan mode (i.e. a photo mode may cause a calibration before the preview and final scans for instance); and
12. Exposure balance between color channels.

The above optical scanners allow images to be scanned into a computer system for modification and use via line 31 of FIG. 1 using a known method. A known software application running on the computer system controls start/stop functions, the receiving of a scanned image, and a full calibration of the scanner using a calibration strip. In particular, the application software for most scanners will initiate a full calibration of a scanner by sending a command to the scanner or by calling a particular function in the driver that tells the scanner to perform the calibration process.

Generally, the full calibration process involves the scanner moving the scanner carriage to a position where it can "see" and scan a calibration feature such as a calibration strip, internal or external to the scanner. Most, if not all, flatbed scanners have a calibration strip under the top cover of the scanner, however, some scanners, such as a HP PHOTOSMART scanner, use a card that is inserted by the user.

The information obtained during the calibration helps to afford the best image quality by "calibrating out" dust in the optical path, dark signal noise, light signal noise, and other variations related to the above listed conditions. The gains are mostly in the area of performance. Consequently, for a scanner to perform at optimal efficiently, the full calibration should occur after the initiation of the light source ("power-up calibration"), before each scan ("prescan calibration"), and any time the scanner properties change or the system (specifically the imaging portion—including optics and electronics) changes due to environmental conditions ("equipment calibration").

The full calibration method for a digital scanner having the above imaging capture system will now be described in accordance with a preferred embodiment of the present invention and FIG. 1. However, as mentioned above, a person of ordinary skill in the relevant arts will appreciate that the inventive system is not so limited as to the above system. Consequently, the skilled artisan should appreciate that the following full calibration method could be implemented with any optical scanner acting alone or with a printer or fax system that may or may not provide an automatic document feed (ADF) or moving light source.

During a full calibration process, the digital scanner 10 causes a lamp 16 to illuminate the calibration strip 27. The light reflected from the calibration strip 27 is directed towards a sensor array 21 which may be either a CCD sensor or a full width array sensor. The sensor array 21 converts the light into electrical signals corresponding to digital image data representing the image that has been scanned, namely the image of the calibration strip 27. This image data is then fed to a calibration circuit within the imaging capture system 25 and compared to the data stored in the nonvolatile memory 39. The stored data includes the predetermined or pre-measured reflectance values of the several portions of the calibration strip 27. The calibration circuit then produces offset and gain correction data by comparing the signal from each of the sensor's pixels with the stored predetermined data value for the calibration strip.

As mentioned earlier, a conventional scanner will typically initiate the above full calibration process only after a power-on, cable plug-in, a user request, equipment change or a predetermined number of scans has occurred. Each time a full calibration occurs, the imaging capture system 25 selectively receives reference data from the calibration strip to adjust any values of the scanner. The reference data is compared to the stored data from the last scan or calibration to determine what adjustments must be made to calibrate the scanner or system. In other words, a conventional scanner is only calibrated if a user requests such an action or a static condition occurs that will initiate the calibration process. In addition, the calibration is always based on the preestablished values set by the calibration strip and not the operational history of the scanner.

In accordance with a preferred embodiment of the present invention, the data collected by the imaging capture system 25 during any scan or calibration will be stored for future use. In particular, the present inventive process stores the data of all operational conditions generated from the power-on calibration and any subsequent calibration or scans into the memory 39 of the imaging capture system 25. In addition, the data is categorized by a conventional method so that select retrieval of any of the data can be easily obtained for evaluation.

The inventive sub-calibration process will use the data after any static request is made by the conventional scanner system is requested or an evaluation of the data determines a predetermined deviation of the operational condition. In particular, the inventive sub-calibration method will retrieve the stored data of previous scans and calibrations for evaluation. The data will be quickly evaluated for various indications that would specifically conclude that a calibration was pertinent. Such indications could include a large degradation in the amount of light produced by the scanning bulb or an increase in the temperature over the last few scans. Similarly, the indication could be from the lamp turning on after the scanner has turned the lamp off (to conserve lamp life and power) and a request for a different scan type (i.e., black and white scan vs. a color scan). Lastly, the indication could be the fact that the user specifically requested the calibration.

In any event, once the data has been evaluated, the inventive sub-calibration software determines what aspect of the scanner system, if any, needs to be calibrated. This determination is made by the sub-calibration software evaluating what data has changed over the past scans. If no data has changed or no significant data has changed, a full calibration will not be conducted. Therefore, the time to conduct a requested full calibration of the scanner will be nearly eliminated since the only time lost will be that time necessary for the conventional scanner software to request a full calibration and the inventive sub-calibration software to receive and evaluate the data of previous scans and calibrations.

In contrast, if the sub-calibration process determines that a partial or full calibration is necessary by the evaluation of the stored data, the following sub-calibration software will occur.

Figure 3:
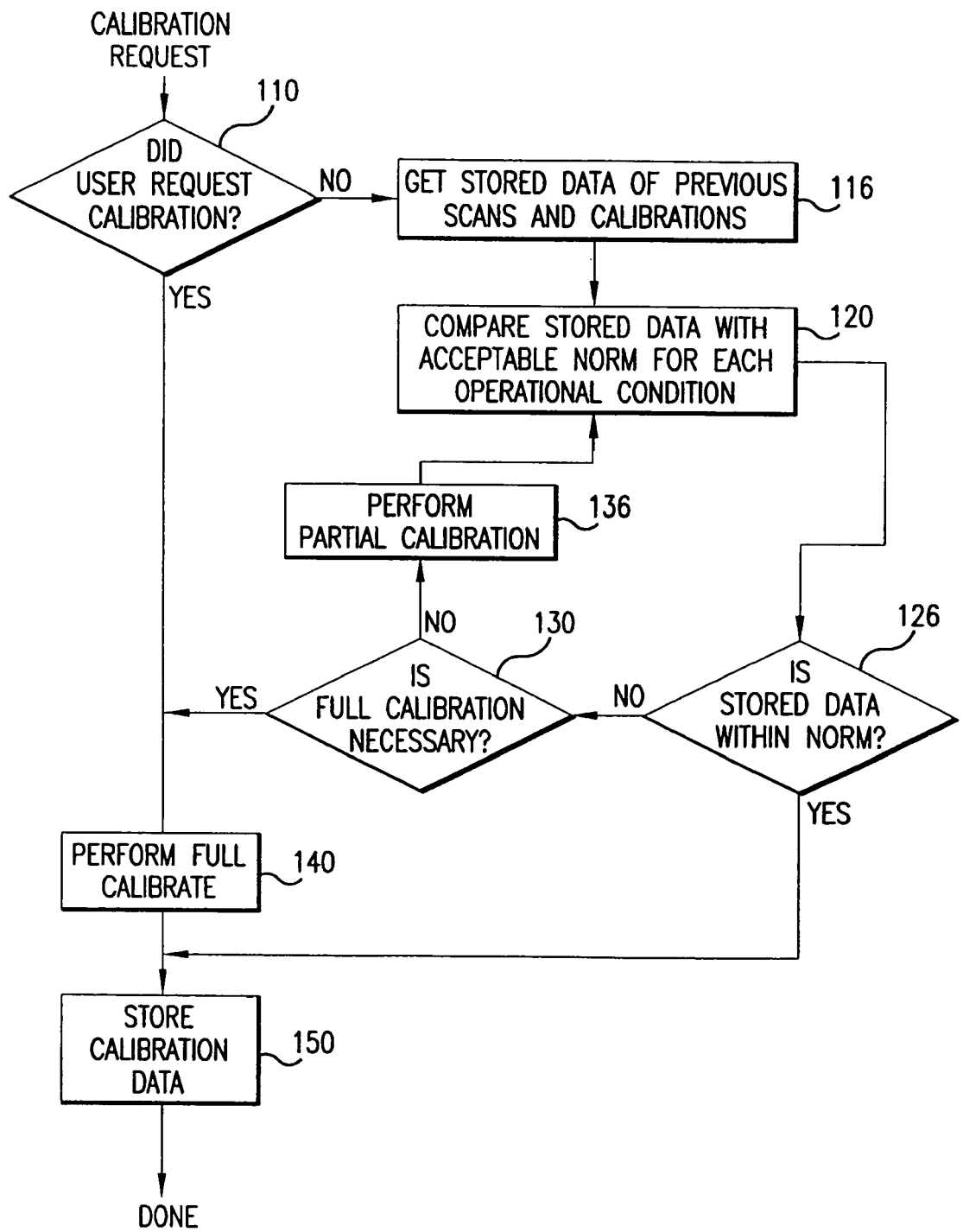
FIG. 3 illustrates a flow chart for practicing the present invention with the scanner of FIG. 1.

Referring now to FIG. 3, the basic steps of the present invention as recited above will now follow. The first step involves the imaging capture system recognizing a condition to activate the calibration process 110. As mentioned above, the condition may be selected from the group including: the scanner being powered-on, the user plugging an interface cable from the scanner into the operating system (i.e., the cable could be a universal serial bus ("USB"), SCSI bus, or a parallel bus), an equipment change, a user request, and a predetermined number of scans have occurred.

At such time, the inventive sub-calibration software retrieves the stored data of previous calibrations and scans data from the memory 116. Next, the inventive software evaluates the data from each operational sensor of the imaging capture system 120 (i.e., any software or hardware component related to the scanner and host computer for operating the same). The evaluation process looks for a change or degradation in the data from predetermined values or average values for each operational sensor. The user or manufacture will provide the predetermined values, and the average value is calculated during the evaluation.

If the evaluation determines that the data is within an acceptable or normal range 126, a full calibration will not be conducted. For example, if the temperature recorded for the previous scans and calibrations has not changed more than a certain percentage, then a calibration process will not occur. However, if the evaluation determines that any of the operational conditions are not within the norm, the sub-calibration software will determine whether a full or a partial calibration is necessary 130.

The process of performing a partial calibration 136 occurs when the sub-calibration software determines that an increase or decrease to a control command for the operational device that needs the adjustment can be performed without additional data, e.g., the scan of the calibration strip. Such a partial calibration may occur with the following operational conditions: CCD amplifier gain, home position, DC offset, lamp uniformity (really CCD amplifier gain on a per pixel basis)— the majority of adjustable things are related to the CCD gain in one way or another; gains are adjusted for individual colors or overall.

Specific situation that might require a partial calibration could include the following examples. If the evaluation determines that only the temperature of the operational system is slightly outside an acceptable range, the control for the temperature would be changed just enough to fix the problem. Similarly, if the lamp's nominal intensity changes, a partial calibration would take place so as to compensate for the lamp's decreasing intensity. In the case where the lamp failed to start correctly, it's intensity would be very low which would in turn cause an indication of a failed part to the user.

For any of the above operational conditions, the software will send a command to the scanner to calibrate the operational condition through the associated driver that will in turn modify the parameter in question. In the case of a custom interface (i.e. not USB, SCSI, IEEE1284, IEEE1394, etc.) the scanner interface may send an analog voltage to adjust the parameter. There are numerous ways to make the adjustments. The driver may also modify a variable to compensate for a parameter change. The variable would be changed in relation to the data collected during a calibration scan for instance. Once a partial calibration is conducted, the changes to the conditions are stored in memory 150. If desired, the new data may be evaluated again 120 and 126 before the partial calibration is complete.

If the inventive sub-calibration system determines that a partial calibration will not resolve the problem, a full calibration will be either self-initiated or the host computer or user will be advised to do the same 140. A full calibration will typically be conducted before the user is notified to have the system services because the new data received from the full calibration may provide the necessary information to allow the problem to be resolved. One such example would involve turning the lamp on from a cold state. The lamp is not consistent from one start to another and therefore requires all the lamp related parameters to be calibrated. Another example would involve a home position failure since all future scans, including full calibration scans, require an accurate home position determination. Note that a full calibration is also performed at 140 where a user requests a calibration at 110.

An example of a condition that may require user intervention would include a situation where the evaluation determines that the light brightness has diminished to an unacceptable level. Consequently, in most cases, the user may need to clean or replace the lamp or have the scanner serviced.

Lastly, the sub-calibration software adds any calibration data related to a partial calibration or full calibration to the memory for future use.

The skilled artisan should appreciate that the above calibration method could include numerous additional steps or conditions for initiating a calibration. However, no matter what the alterations may be for a specific optical scanner, the present inventive steps can be incorporated to expedite the calibration process.

This invention does not regulate which type of calibration will be performed. The scanner's firmware or the software residing on the PC does that step (including the driver). This invention determines when a calibration may be necessary based on some external factor or the operational conditions listed above. This behavior is independent of the user interface (i.e. a scan calibration button) and is dynamic since the calibration step may occur without a static condition and only on the constant or random review of the stored data for all operational conditions. On the other hand, the skilled artisan should appreciate that this inventive process could also include the function of determining which calibration is needed and communicate that information to the user, instead of just notifying the user that a calibration or service is necessary.

To better define some of the alterations that may be added to the above calibration process, the following patents are incorporated herein by reference. The first invention provides an optical scanner having application software that activates a calibration after a predetermined number of scans occur. In particular the device disclosed in U.S. Pat. No. 3,952,144 to Kolker. Kolker discloses that a facsimile transmitter makes a preliminary calibrating scan in which the transmitter sequentially scans a known black area and a known white area. An automatic background and contrast control unit stores a first sample of the uncorrected video signal which represents the scanned black area and stores a second sample of the uncorrected video signal which represents the scanned white area.

During subsequent scanning, the automatic background and contrast control unit continually produces voltages representing the stored black and white samples and uses these voltages to correct the video signal received during the scanning of the document.

Another example of a device which corrects for offset and gain errors is disclosed in U.S. Pat. No. 4,555,732 to Tuhro. This U.S. Patent discloses an image sensor correction system which maintains the offset voltages in the shift registers of a multi-channel image sensor substantially equal.

A device which proposes to correct gain and offset errors due to changes in the operating characteristics of a CCD is disclosed in U.S. Pat. No. 4,216,503 to Wiggins. This U.S. Patent discloses a system where dark and light level signals are isolated and processed by a microprocessor unit in accordance with a pre-established routine to provide an offset potential and gain multiplicand. The determined offset potential and gain multiplicand are used to remove the offset and set a signal gain for the next succeeding line of image signals. The process is then repeated for each line of image signals to be outputted from the CCD.

In summary, the present invention provides a process for optimizing the time required for scanning a document with any conventional scanner. More specifically, the present invention will utilize calibration information from the initial power-up calibration or any other calibration, and the information from any previous scans to expedite or eliminate the need for future calibration requests. This process will save time for the user to obtain an optimal scan and increase the operable life span of the scanner by eliminating many repetitive scan cycles.

What is claimed is:

1. A method of calibrating an image capture system, said method comprising:
    said system obtaining operational data including temperature data;
    said system determining whether or not said operational data is within a normal range;
    said system performing or not performing a calibration as a function of whether or not said operational data is within said normal range; and
    in the event said operational data is not within said normal range, said system determining whether to perform a full calibration involving scanning a calibration feature or a partial calibration not involving scanning said calibration feature.

2. A method as recited in claim 1 wherein said determining whether to perform a full calibration involves determining whether a lamp is being turned on from a cold start or if a home-position failure has occurred, and, if so, said performing involving said full calibration.

3. A method as recited in claim 1 further comprising said system storing calibration data from said calibration for future use in determining a normal range.

4. A scanning system comprising:
    a plurality of image and operational sensors for generating image data and operational data, said operational data including temperature data;
    a memory unit for storing normal operational data ranges and said operational data from said sensors from performed calibrations, said normal operational data ranges including a normal temperature range;
    a calibration controller operative to selectively, based on a comparison of stored operational data and said normal operational data ranges, perform or not perform a calibration of said scanning system; and
    a calibration feature, said calibration controller, when it has determined that a calibration is to be performed, determining whether to perform a full calibration involving scanning said calibration feature or a partial calibration not involving scanning of said calibration feature.

5. A scanning system as recited in claim 4 wherein said determining involves determining whether a lamp is being turned on from a cold start or if a home-position failure has occurred, and, if so, said performing involving said full calibration.

6. A computer product comprising non-transitory computer-readable storage media having computer-readable instructions encoded thereon, said instructions, when executed by a scanning system, providing for:
    said system obtaining operational data including temperature data;
    said system determining whether or not said operation data is within a normal range;
    said system performing or not performing a calibration as a function of whether or not said operational data is within a normal range; and
    in the event said operational data is not within said normal range, said system determining whether to perform a full calibration involving scanning a calibration feature or a partial calibration not involving scanning said calibration feature.

7. A computer product as recited in claim 6 wherein said determining whether to perform a full calibration involves determining whether a lamp is being turned on from a cold start or if a home-position failure has occurred, and, if so, said performing involving said full calibration.

8. A computer product as recited in claim 6 wherein said instructions, when executed, further provide for storing calibration data from said calibration for determining a normal range.

* * * * *